United States Patent [19]

Sano et al.

[11] Patent Number: 5,506,183
[45] Date of Patent: Apr. 9, 1996

[54] CATALYST FOR PREPARING POLYOLEFINS

[75] Inventors: Akira Sano; Takeichi Shiraishi, both of Kawasaki; Sinichi Yanahashi, Yokohama; Hiroyuki Shimizu; Kazuo Matsuura, both of Tokyo, all of Japan

[73] Assignee: Nippon Oil Company, Limited, Tokyo, Japan

[21] Appl. No.: 287,710

[22] Filed: Aug. 9, 1994

Related U.S. Application Data

[63] Continuation of Ser. No. 17,312, Feb. 11, 1993, abandoned, which is a continuation of Ser. No. 559,364, Jul. 30, 1990, abandoned.

[30] Foreign Application Priority Data

Aug. 3, 1989 [JP] Japan .................................... 1-200348

[51] Int. Cl.$^6$ .................................... C08F 4/654
[52] U.S. Cl. .......................... 502/113; 502/110; 502/114; 502/115; 502/120; 502/123; 502/125; 502/126; 502/127; 526/114; 526/116; 526/119; 526/124.4; 526/124.6
[58] Field of Search .................... 502/113, 114, 502/115, 125, 127, 110, 120, 123, 126; 526/114, 116, 119, 124.4, 124.6

[56] References Cited

U.S. PATENT DOCUMENTS

| | | | |
|---|---|---|---|
| 3,701,766 | 10/1972 | Delbouille et al. | 526/129 |
| 4,154,915 | 5/1979 | Matsuura et al. | 526/124 |
| 4,396,534 | 8/1983 | Matsuura et al. | 526/125 |
| 4,613,581 | 9/1986 | Maruyama et al. | 526/125 |
| 4,732,882 | 3/1988 | Allen et al. | 502/104 |
| 5,369,193 | 11/1994 | Sano et al. | 526/116 |

FOREIGN PATENT DOCUMENTS

| | | |
|---|---|---|
| 2521662 | 11/1975 | Germany . |
| 1292853 | 10/1972 | United Kingdom . |

*Primary Examiner*—Romulo H. Delmendo
*Attorney, Agent, or Firm*—Dilworth & Barrese

[57] ABSTRACT

Polyolefins having better particle properties are obtained by polymerizing olefins in the presence of a catalyst comprising a solid catalyst component and an organometallic compound, the said solid catalyst component being prepared by reacting the following components [I] and [II] and further reacting the resulting reaction product with the following component [III]:

[I] a reaction product obtained by reacting:
   (1) a silicon oxide and/or an aluminum oxide, and
   (2) a titanium compound, or a titanium compound and a vanadium compound, and further reacting the resulting reaction product with:
   (3) an organoaluminum compound;

[II] a reaction product obtained by the reaction of:
   (1) a magnesium halide, and
   (2) a compound represented by the general formula $Me(OR)_n X_{z-n}$ wherein Me represents an element of Groups I to IV in the Periodic Table, z represents the valence of the element Me, n is $0 < n \leq z$, X is a halogen atom, and R is a hydrocarbon residue having 1 to 20 carbon atoms; and

[III] a compound represented by the general formula $Si(OR)_m X_{4-m}$ wherein R is a hydrocarbon residue having 1 to 20 carbon atoms, X is a halogen atom, and m is $0 \leq m \leq 4$.

18 Claims, No Drawings

CATALYST FOR PREPARING POLYOLEFINS

This is a continuation, of application Ser. No. 08/017,312 filed on Feb. 11, 1993now abandoned, which is a continuation application 07/559,364 filed on Jul. 30, 1990, now abandoned.

BACKGROUND OF THE INVENTION

The present invention relates to a process for preparing novel polyolefins. More particularly, the present invention is concerned with a process for preparing polyolefins exhibiting better particle properties with increase of an average particle diameter, which process is capable to greatly increasing the polymer yield per solids and that per transition metal, thereby permitting the omission of the step of removing catalyst remaining in the resulting polymer, further capable of increasing the bulk density of the polymer and decreasing a fine particulate portion of the polymer.

Heretofore, in the technical field there have been known many catalysts comprising inorganic magnesium solids as carriers such as magnesium halide, magnesium oxide and magnesium hydroxide and a transition metal compound such as a titanium compound or a vanadium compound supported on the carriers. However, the polyolefins obtained in the prior art are generally low in bulk density, relatively small in average particle diameter and generally wide in particle size distribution so contain a large proportion of fine particles. For this reason, improvement has keenly been desired from the standpoint of productivity and polymer handling. Besides, when these powdery polymers are subjected to forming, there arise problems such as dusting and lowering of the forming efficiency. So there has been a keen desire for the foregoing increase of bulk density and decrease of the fine particulate portion. Further, still further improvements are considered necessary in order to satisfy the recent keen desire for omitting the pelletizing step and using a powdery polymer directly in a processing machine.

The present inventors have previously found out a novel catalyst component with the above drawbacks remedied and already filed patent applications thereon (see Japanese Patent Publication Nos. 11651/1989 and 12289/1989 and Japanese Patent Laid Open Nos. 149605/1985, 32105/1987 and 207306/1987). The use of this catalyst component can afford a polymer having a high bulk density and a large average particle diameter. However, a further improvement has been considered necessary for omitting the pelletizing step and using a powdery polymer directly in a processing machine.

It is the object of the present invention to remedy the above-mentioned drawbacks and obtain in extremely high activity a polymer having a high bulk density, a narrow particle size distribution, an extremely small proportion of fine particles, and superior in fluidity.

SUMMARY OF THE INVENTION

The present invention, in the first aspect thereof, resides in a process for preparing a polyolefin by polymerizing or copolymerizing an olefin or olefins in the presence of a catalyst comprising a solid catalyst component and an organometallic compound, the said solid catalyst component being prepared by reacting the following components [I] and [II] at first and further reacting the resulting reaction product with the following component [III]:

[I] a reaction product obtained by reacting:
  (1) a silicon oxide and/or an aluminum oxide, and
  (2) a titanium compound, or a titanium compound and a vanadium compound, and further reacting the resulting reaction product with:
  (3) an organoaluminum compound;

[II] a reaction product obtained by the reaction of:
  (1) a magnesium halide, and
  (2) a compound represented by the general formula $Me(OR)_n X_{z-n}$ wherein Me represents an element of I to IV in the Periodic Table, z represents the valence of the element Me, n is $0<n \leq z$, X is a halogen atom, and R is a hydrocarbon residue having 1 to 20 carbon atoms; and

[III] a compound represented by the general formula $Si(OR)_m X_{4-m}$ wherein R is a hydrocarbon residue having 1 to 20 carbon atoms, X is a halogen atom, and m is $0 \leq m \leq 4$.

The present invention, in the second aspect thereof, resides in a process for preparing a polyolefin by polymerizing or copolymerizing an olefin or olefins in the presence of a catalyst comprising a solid catalyst component and an organometallic compound, the said solid catalyst component being prepared by reacting the following components [I] and [II] at first and further reacting the resulting reaction product with the following component [III]:

[I] a reaction product obtained by reacting:
  (1) a silicon oxide and/or an aluminum oxide, and
  (2) a titanium compound, or a titanium compound and a vanadium compound, and further reacting the resulting reaction product with:
  (3) an organoaluminum compound;

[II] a reaction product obtained by the reaction of:
  (1) a magnesium halide,
  (2) a compound represented by the general formula $Me(OR)_n X_{z-n}$ wherein Me represents an element of I to IV in the Periodic Table, z represents the valence of the element Me, n is $0<n \leq z$, X is a halogen atom, and R is a hydrocarbon residue having 1 to 20 carbon atoms, and
  (3) a titanium compound, or a titanium compound and a vanadium compound; and

[III] a compound represented by the general formula $Si(OR)_m X_{4-m}$ wherein R is a hydrocarbon residue having 1 to 20 carbon atoms, X is a halogen atom, and m is $0 \leq m \leq 4$.

By the process of the present invention there is obtained, in extremely high activity, a polyolefin having a relatively large average particle diameter, a narrow particle size distribution and a reduced proportion of fine particles. Besides, the bulk density and free fluidity of the polyolefin are high. These characteristics are very advantageous to the polymerization operation. Further, the polyolefin prepared by the process of the present invention can be subjected to forming not only as pellets but also in the form of powder, without causing any trouble.

It is also a characteristic feature of the present invention that the polymer obtained using the catalyst specified in the present invention is extremely narrow in its molecular weight distribution and small in the amount thereof extracted in hexane, and that the amount of low grade polymers by-produced is very small. Therefore, when film is formed using the polyolefin of a narrow molecular weight distribution prepared by the process of the present invention, it has a lot of merits, for example, high transparency, superior anti-blocking property and heat-sealability.

DETAILED DESCRIPTION OF THE INVENTION

The present invention will be described concretely hereinunder.

The catalyst used in the polyolefin preparing process of the present invention comprises a solid catalyst component and an organometallic compound, the said solid catalyst component being prepared by reacting the following components [I] and [II] at first and further reacting the resulting reaction product with the following component [III]: [I] a reaction product obtained by reacting (1) a silicon oxide and/or an aluminum oxide with (2) a titanium compound, or a titanium compound and a vanadium compound, and further contacting the resulting reaction product with (3) an organoaluminum compound; [II] a reaction product obtained by contacting (1) a magnesium halide and (2) a compound of the general formula $Me(OR)_nX_{z-n}$ and, if desired, (3) a titanium compound, or a titanium compound and a vanadium compound; and [III] a compound of the general formula $Si(OR)_mX_{4-m}$.

<1> Solid Catalyst Component

1. Component [I]

The silicon oxide used in the present invention is silica or a double oxide of silicon and at least one another metal selected from Groups I–VIII of the Periodic Table.

The aluminum oxide used as component (1) in the present invention is alumina or a double oxide of aluminum and at least one another metal selected from Groups I–VIII in the Periodic Table.

As typical examples to the double oxide of silicon or aluminum and at least one another metal selected from Groups I–VIII in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, and $SiO_2$ MgO. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of impurities.

Although the properties of the silicon oxide and/or aluminum oxide used in the present invention are not specially limited so far as the objects of the present invention are not adversely affected thereby, a silica having a particle diameter of 1 to 200 μ, an average pore colume of greater than 0.3 ml/g and a surface area of greater than 50 m²/g is preferred. Also, it is preferably calcined prior to use.

As examples of the titanium compound and vanadium compound contacted with the silicon oxide and/or aluminum oxide there may be mentioned halides, alkoxyhalides, alkoxides and halogenated oxides of titanium and vanadium. Preferred examples of the titanium compound in the present invention are tetravalent and trivalent titanium compounds. As tetravalent titanium compounds, those of the general formula $Ti(OR)_nX_{4-n}$ are preferred wherein R is an alkyl, aryl or aralkyl group having 1 to 20 carbon atoms, X is a halogen atom and n is $0 \leq n \leq 4$. Examples are titanium tetra halides such as titanium tetrachloride, titanium tetrabromide and titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, tetraisopropoxytitanium, monobutoxytrichlorotitanium, dibutoxydichlorotitanium, tributoxymonochlorotitanium, tetrabutoxytitanium, monopentoxytrichlorotitanium, monophenoxytrichlorotitanium, diphenoxydichlorotitanium, triphenoxymonochlorotitanium and tetraphenoxytitanium. As trivalent titanium compounds there may be used, for example, titanium trihalides obtained by reducing titanium tetrahalides such as titanium tetrachlorides and titanium tetrabromide with hydrogen, aluminum, titanium or an organometallic compound of a metal selected from Groups I through III in the Periodic Table as well as trivalent titanium compounds obtained by reducing tetravalent alkoxytitanium halides or tetraalkoxytitaniums of the general formula $Ti(OR)_mX_{4-m}$ wherein R is an alkyl aryl, or aralkyl group having 1 to 20 carbon atoms, X is a halogen atom and m is $0 < m \leq 4$, with an organometallic compound of a metal selected from Groups I through III in the Periodic Table. Among them, titanium tetrahalides are most preferable.

As examples of the vanadium compound are mentioned tetravalent vanadium compounds such as vanadium tetrachloride, vanadium tetrabromide, vanadium tetraiodide, and tetraethoxyvanadium; pentavalent vanadium compounds such as vanadium oxytrichloride, ethoxydichlorovanadyl, triethoxyvanadyl, and tributoxyvanadyl; and trivalent vanadium compounds such as vanadium trichloride and vanadium triethoxide.

When the titanium compound and the vanadium compound are used together, it is preferable that the V/Ti molar ratio be in the range of 2/1 to 0.01/1.

The reaction ratio of the silicon oxide and/or the aluminum oxide, (hereinafter referred to simply as component [I]-(1)), and the titanium compound, or the titanium compound and the vanadium compound, (simply as component [I]-(2) hereinafter), differs depending on whether the component [I]-(1) is subjected to a calcing treatment or not and conditions for the calcining treatment, but it is desirable to use the component [I]-(2) in an amount of 0.01 to 10.0 mmol, more preferably 0.1 to 5.0 mmol, still more preferably 0.2 to 2.0 mmol, per gram of the component [I]-(1).

How to react the components [I]-(1) and [I]-(2) is not specially limited as long as the object of the present invention is not impaired. But according to a preferred method, both components are mixed together under heating at a temperature of 20° to 300° C., preferably 50° to 150° C., for 5 minutes to 10 hours, in the presence of an inert hydrocarbon solvent (later-described) which has been subjected to a dehydration treatment to a thorough extent, or both components are contacted together as they are in the presence of an inert hydrocarbon, to obtain the reaction product.

After contact reaction of the components [I]-(1) and [I]-(2), the reaction product may be washed several times with an inert hydrocarbon solvent. After this contact reaction of both components, the inert hydrocarbon solvent may be removed by evaporation, or the operation may proceed to the next contact reaction with the organoaluminum compound without such evaporation.

Now, the step of contacting the reaction product of the components [I]-(1) aria with the organoaluminum compound will be described. As the organoaluminum compound used in the present invention, a compound represented by the general formula $R_nAlX_{3-n}$ is suitable wherein R is a hydrocarbon residue having 1 to 24, preferably 1 to 12, carbon atoms such as, for example, alkyl, aryl, or aralkyl, X is a halogen atom, and n is $0 < n \leq 3$. Examples are dimethylaluminum chloride, diethylaluminum chloride, diethylaluminum bromide, diisopropylaluminum chloride, methylaluminum dichloride, ethylaluminum dichloride, isopropylaluminum dichloride, trimethylaluminum, triethylaluminum, triisopropylaluminum, triisobutylaluminum, trioctylaluminum, tridecylaluminum, and ethylaluminum sesquichloride, with diethylaluminum chloride being particularly preferred.

It is desirable that the contact ratio of the contact reaction product of the components [I]-(1) and [I]-(2) and the organoaluminum compound (simply as component [I]-(3) hereinafter) be in the range of 0.1 to 100, preferably 0.2 to 10, more preferably 0.5 to 5, in terms of component [I]-(3)/ component [I]-(2) (molar ratio).

How to contact the contact reaction product of the components [I]-(1) and [I]-(2) with the component [I]-(3) is not specially limited. But according to a preferred method, the contact reaction product of the components [I]-(1) and [I]-(2) and the component [I]-(3) are mixed together under heating at a temperature of 20° to 300° C., preferably 50° to 150° C., for 5 minutes to 10 hours, in the presence of an inert hydrocarbon solvent, thereby contacted and reacted together, thereafter unreacted organoaluminum compound is removed by washing several times with an inert hydrocarbon solvent such as hexane or heptane, followed by removal of the inert hydrocarbon solvent by evaporation to obtain the component [I].

2. Component [II]

As the magnesium halide [II]-(1) there is used a substantially anhydrous one. Examples are magnesium dihalides such as magnesium fluoride, magnesium chloride, magnesium bromide, and magnesium iodide, with magnesium chloride being particularly preferred.

These magnesium halides may have been treated with electron donors such as alcohols, esters, ketones, carboxylic acids, ethers, amines, and phosphines.

As examples of the compound [II]-(2) of the general formula $Me(OR)_nX_{z-n}$ used in the present invention wherein Me represents an element of Groups I to IV in the Periodic Table, z represents the valence of the element Me, n is $0<n\leq z$, X is a halogen atom, and R is a hydrocarbon residue having 1 to 20 carbon atoms such as, for example, alkyl, aryl, or aralkyl, and Rs may be the same or different, there are mentioned compounds represented by $NaOR$, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$, $Si(OR)_4$, $Si(OR)_3X$, $Si(OR)_2X_2$, $Si(OR)X_3$, $Si(OR)X_3$, and $Sn(OR)_4$). More concrete and preferred examples are $Mg(OC_2H_5)_2$, $Mg(OC_2H_5)Cl$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OCH_3)_2Cl$, $Al(OC_2H_5)_2Cl$, $Al(oc_2H_5)Cl_2$, $Al(Oi-C_3H_7)_2Cl$, $Al(Oi-C_3H_7)Cl_2$, $Si(OC_2H_5)_4$, $Si(OC_2H_5)_3Cl$, $Si(OC_2H_5)_2Cl_2$, $Si(OC_2H_5)Cl_3$.

It is desirable that the reaction ratio of the magnesium halide and the compound represented by the general formula $Me(OR)_nX_{z-n}$ be in the range of 0.01 to 10, preferably 0.1 to 5, in terms of Me/Mg (molar ratio).

The method of reaction between the magnesium halide (simply as component [II]-(1) hereinafter) and the compound (simply as component [II]-(2)) represented by the general formula $Me(OR)_nX_{z-n}$ is not specially limited. There may be adopted a method in which both components are co-pulverized using, for example, ball mill, vibration mill, rod mill, or impact mill, at a temperature of 0° to 200° C., for 30 minutes to 50 hours, in the presence or absence of an inert hydrocarbon solvent. Or there may be adopted a method in which both components, [II]-(1) and [II]-(2), are mixed and reacted together under heating at a temperature of 20° to 400° C., preferably 50° to 300° C., for 5 minutes to 10 hours, in an organic solvent selected from inert hydrocarbons, alcohols, phenols, ethers, ketones, esters, nitriles and mixtures thereof (these organic solvents will later be explained concretely), and thereafter the solvent is evaporated off. The method of co-pulverizing the two is preferred in the present invention.

To make the present invention more effective, there may be used a component obtained by contacting the components [II]-(1) and [II]-(2) with a titanium compound, or a titanium compound and a vanadium compound, as component [II]-(3). The titanium compound and the vanadium compound just referred to are selected from various titanium compounds and vanadium compounds which are employable as component [I]-(2). The component [II]-(3) used may be the same as or different from the component [I]-(2) used. But titanium compounds represented by the general formula $Ti(OR)_nX_{4-n}$ are preferred wherein R is an alkyl, aryl or aralkyl group having 1 to 20 carbon atoms, X is a halogen atom and n is $0\leq n\leq 4$. Titanium tetrachloride is particularly preferred.

It is desirable that the amount of the titanium compound, or the titanium compound and the vanadium compound, (simply as component [II]-(3) hereinafter), be in the range of 0.01 to 5, more preferably 0.05 to 1, in terms of [II]-(3)/[II]-(4) (molar ratio).

In the case of contacting the components [II]-(1) and [II]-(2) further with the component [II]-(3), the method of making this contact is not specially limited. The components [II]-(1), [II](2) and [II]-(3) may be contacted together at a time, or in a desired order. Preferably, the three components may be contacted together simultaneously, or the components [II]-(1) and [II]-(2) are contacted together beforehand as noted previously, and thereafter the component [II]-(3) is contacted with them.

For contacting the components [II]-(1), [II]-(2) and [II]-(3), like the foregoing method of contacting the components [II]-(1) and [II]-(2), there may be adopted a method in which they are contacted together in an organic solvent, or a method in which they are co-pulverized. Preferably, after co-pulverization of the components [II]-(1) and [II]-(2), the co-pulverized product is reacted with the component [II]-(3) in an organic solvent, and then the solvent is removed by evaporation, or the components [II]-(1) to [II]-(3) are co-pulverized at a time.

Thus, by contacting the components [II]-(1) and [II]-(2) together and, if desired, further contacting them with the component [II]-(3) there is obtained the component [II].

3. Component [III]

Examples of the compound of the general formula $Si(OR')_mX_{4-m}$ wherein R' is a hydrocarbon residue having 1 to 24 carbon atoms such as alkyl, aryl or aralkyl group, X is a halogen atom and m is $0\leq m\leq 4$ used as the component [III] are silicon tetrachloride, monomethoxytrichlorosilane, monomethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytriclorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane and tetraisopropoxysilane. Among them, tetraethoxysilane is most preferable.

4. Preparation of the Said Catalyst Component

The solid catalyst component used in the present invention is obtained by reacting the components [I] and [II] and further reacting the resulting reaction product with the component [III]. As to the reaction ratio of the components [I] and [II], the component [II]-(1) is used in an amount of 0.01 to 20 mmol, preferably 0.1 to 10 mmol, more preferably 0.2 to 4.0 mmol, per gram of the component [I]-(1).

As to the reaction ratio of the reaction product of the component [I] and [II] and the component [III] is 0.01–10, preferably 0.05–5, more preferably 0.1–2 in terms of the component [III]/the component [I]-(2) (molar ratio).

How to react the components [I] and [II] is not specially limited. Both components may be co-pulverized at a temperature of 0° to 200° C. for 30 minutes to 50 hours, or there may be adopted a method in which both components are mixed together under heating at a temperature of 50° to 300° C. for 1 minute to 48 hours in an organic solvent selected from inert hydrocarbons, alcohols, phenols, ethers, ketones, esters, amines, nitriles, and mixtures thereof, and thereafter the solvent is removed. The latter method is preferred.

How to react the reaction product of the components [I] and [II] and the component [III] is not specially limited. Both may be reacted by means of co-pulverization or reacted in the presence or absence of an inert solvent. The reaction may be carried out a temperature of 20° to 400° C., preferably 50° to 300° C. for 5 minutes to 20 hours. Of course, the reaction operations for the preparation of the components [I], [II], [III] and the solid catalyst component should be performed in an inert gas atmosphere and in a moisture-free condition.

The following is a more detailed description about the organic solvents employable in the preparation of the components [I], [II] and [III] and the solid catalyst component.

The aforementioned inert hydrocarbon solvents which may be used in the present invention are not specially limited if only they are inert to Ziegler catalysts commonly used. Examples are pentane, hexane, cyclohexane, heptane, octane, nonane, decane, benzene, toluene, xylene, and mixtures thereof.

The foregoing alcohols and phenols employable in the present invention indicate the compounds of the general formula ROH wherein R represents a hydrocarbon residue having 1 to 20 carbon atoms such as alkyl, alkenyl, aryl or aralkyl, or an organic residue containing oxygen, nitrogen, sulfur, chlorine, or another element. Examples are methanol, ethanol, propanol, butanol, pentanol, hexanol, octanol, 2-ethyl hexanol, phenol, chlorophenol, benzyl alcohol, methyl cellosolve, ethyl cellosolve, and mixtures thereof.

Preferred as the foregoing ethers are the compounds of the general formula R-O-R' wherein R and R', which may be the same or different, are each a hydrocarbon residue having 1 to 20 carbon atoms such as alkyl, alkenyl, aryl or aralkyl, or may be an organic residue containing oxygen, nitrogen, sulfur, chlorine, or another elements, and R and R' may conjongly conjointly form a ring. Examples are dimethyl ether, diethyl ether, diisopropyl ether, dibutyl ether, diamly ether, tetrahydrofuran, dioxane, anisole, and mixtures thereof.

Preferred as the foregoing ketones are the compounds of the general formula

wherein R and R', which may be the same or different, are each a hydrocarbon residue having 1 to 20 carbon atoms such as alkyl, alkenyl, aryl or aralkyl, or may be an organic residue containing oxygen, nitrogen, sulfur, chlorine, or another elements, and R and R' may conjointly form a ring. Examples are acetone, methyl ethyl ketone, methyl isobutyl ketone, ethyl butyl ketone, dihexyl ketone, acetophenone, diphenyl ketone, cyclohexanone, and mixtures thereof.

As the foregoing esters, there are mentioned organic acid esters having 1 to 30 carbon atoms. Examples are methyl formate, methyl acetate, ethyl acetate, propyl acetate, octyl acetate, ethyl propionate, methyl butyrate, ethyl valerate, methyl methacrylate, methyl benzoate, ethyl benzoate, propyl benzoate, octyl benzoate, phenyl benzoate, benzyl benzoate, ethyl o-methoxybenzoate, ethyl p-methoxybenzoate, butyl p-ethyoxybenzoate, methyl P-toluylate, ethyl p-toluylate, ethyl p-ethylbenzoate, methyl salicylate, phenyl salicylate, methyl naphthoate, ethyl naphthoate, ethyl anisate, and mixtures thereof.

As examples of the foregoing nitriles there are mentioned acetonitrile, pripionitrile, butyronitrile, pentyronitrile, benzonitrile, hexanenitrile, and mixtures thereof.

As examples of the foregoing amines there are mentioned methylamine, ethylamine, diethylamine, tributylamine, piperidine, tribenzylamine, aniline, pyridine, picoline, tetramethylenediamine, and mixtures thereof.

By the contact-reaction of the components [I] and [II], followed by the contact-reaction of the resultant reaction product and the component [III] there is obtained a solid catalyst component.

The said solid powder can be used as it is as a solid catalyst component in the preparation of polyolefin, but if this solid component is subjected to a contact treatment with any of various organoaluminum compounds which are employable as the component [I]-(3), and then used as a solid catalyst component, the effect of the present invention can be further enhanced. The organoaluminum compound used for this purpose may be the same as or different from the compound used as the component [I]-(3).

The contacting method in the above contact treatment is not specially limited. But according to a preferred method, both are mixed and reacted together at a temperature of 0° to 300° C., preferably 20° to 150° C., for 5 minutes to 10 hours in the presence or absence of an inert hydrocarbon solvent, and thereafter the solvent is removed by evaporation. Of course, these operations should be conducted in an inert gas atmosphere and in a moisture-free condition.

As to the proportion of the organoaluminum compound in the contact reaction, it is desirable to set the organoaluminum compound/{component [I]-(2)+ component [II]-(3) (an optional component)} molar ratio in the range of 0.01 to 100, preferably 0.2 to 10.

5. Organometallic Compound

The catalyst used in the present invention comprises the above mentioned solid catalyst component and the organometallic compound.

As to the organometallic compound used in the present invention, there may be preferably employed an organometallic compound of a metal of Groups I–IV in the Periodic Table which is known as a component of a Ziegler type catalyst. Particularly preferred are organoaluminum compounds and organozinc compounds. To illustrate these compounds, mention may be made of organoaluminum compounds of the general formulae $R_3Al$, $R_2AlX$, $RAlX_2$, $R_2AlOR$, $RAl(OR)X$ and $R_3Al_2X_3$ wherein R, which may be the same or different, is an alkyl or aryl group having 1 to 20 carbon atoms and X is a halogen atom, as well as organozinc compounds of the general formula $R_2Z_n$ wherein R, which may be the same or different, is an alkyl group having 1 to 20 carbon atoms. Concrete examples are triethylaluminum, triisopropylaluminum, triisobutylaluminum, tri-sec-butylaluminum, tri-tert-butylaluminum, trihexylaluminum, trioxtylaluminum, diethylaluminum chloride, diisopropylaluminum chloride, diethylaluminum ethoxide, ethylaluminum sesquichloride, diethylzinc, and mixtures thereof.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is sued usually in an amount of 0.1 to 1 mole, preferably 0.2 to 0.5 mole, per mole of the organometallic compound. Where it is used as an addition compound of the organometallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate, methyl anisate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl esters, of benzoic acid, o- or p-toluic acid and anisic acid.

6. Polymerization of Olefin

The olefin polymerization using the catalyst of the present invention can be performed in the form os slurry polymerization, solution polymerization or vapor phase polymerization. The catalyst used in the present invention is particularly suitable for vapor phase polymerization. The polymerization reaction is carried out in the same way as in the conventional olefin polymerization reaction using a Ziegler type catalyst. More particularly, the reaction is performed in a substantially oxygen- and water-free condition in the presence or absence of an inert hydrocarbon. Olefin polymerizing conditions involve temperatures in the range of 20° to 120° C., preferably 50° to 100° C., and pressures in the range of atmospheric pressure of 70 kg/cm$^2$, preferably 2 to 60 kg/cm$^2$. Adjustment of the Molecular weight can be done to some extent by changing polymerization conditions such as the polymerization temperature and the catalyst mole ratio, but the addition of hydrogen into the polymerization system is more effective for this purpose. Of course, using the catalyst of the present invention, there can be performed two or more multi-stage polymerization reactions involving different polymerization conditions such as different hydrogen concentrations and different polymerization temperatures.

The process of the present invention is applicable to the polymerization of all olefins that can be polymerized using a Ziegler type catalyst, preferably α-olefins having 2 to 12 carbon atoms. For example, it is suitable for the homopolymerization of such α-olefins as ethylene, propylene, 1-butene, 1-hexene and 4-methyl-1-pentene and the copolymerization of ethylene and an α-olefin having 3–12 carbon atoms such as propylene, 1-butene, 1-hexene and 4-methylpentene-1, the copolymerization of propylene and 1-butene and the copolymerization of ethylene and two or more α-olefins.

Copolymerization with dienes is also preferable for the modification of Polyolefins. Examples of diene compounds which may be used for this purpose are butadiene, 1,4-hexadiene, ethylidene norbornene and dicyclopentadiene. The comonomer content in the copolymerization may be selected optionally. For instance, when ethylene and a α-olefin having 3–12 carbon atoms are copolymerized, the α-olefin content in the copolymer is preferably 0–40 molar %, more preferably 0–30 molar %.

<Effects of the Invention>

Homopolymers or copolymers of olefins prepared by using as catalyst the solid catalyst component and the organometallic compound in the present invention are remarkably high in bulk density, relatively large in average particle diameter and narrow in particle size distribution and have a reduced proportion of fine particles, so there is little adhesion of polymer to the reactor walls during polymerization thus permitting stable operation. Besides, not only dusting can be prevented in a forming operation and so the efficiency of the forming operation can be enhanced, but also it is possible to omit a pelletizing step.

Further, since the homopolymers or copolymers in question according to the present invention are narrow in molecular weight distribution, they can be formed into films having high strength and superior in transparency and also superior in anti-blocking property and heat-sealability.

EXAMPLES

The following examples are given to further illustrate the present invention and for practising the invention, but it is to be understood that the invention is not limited thereto.

EXAMPLE 1

(a) Preparation of Solid Catalyst Component 50 g of SiO$_2$ (Fuji-Davison #955) which had been calcined at 600° C. was placed in a three-necked flask having a capacity of 500 mol and equipped with a stirrer and a reflux condenser, then 160 ml of dehydrated hexane and 3.3 ml of titanium tetrachloride were added, allowing reaction to take place for 3 hours under the reflux of hexane. After cooling, 45 ml of a 1 mmol/cc solution of diethylaluminum chloride in hexane was added and reaction was again allowed to take place for 2 hours under the reflux of hexane, followed by drying under reduced pressure at 120° C. to remove hexane. (Component [I])

10 g of commercially available, anhydrous magnesium chloride and 4.2 g of aluminum triethoxide were charged into a stainless steel pot having an internal volume of 400 ml and containing twenty-five stainless steel balls each ½ inch in diameter, and ball-milling was conducted at room temperature in a nitrogen atmosphere for 16 hours to obtain a reaction product. (Component [II])

5.4 g of the reaction product thus obtained was dissolved in 160 ml of dehydrated ethanol and the resulting solution was poured in the whole amount thereof into the three-necked flask containing the component [I]. Reaction was allowed to take place for 3 hours under the reflux of ethanol, followed by drying under reduced pressure at 150° C. for 6 hours. Then, 2.2 ml of tetraethoxysilane was added and reacted at 90° C. for 3 hours to obtain a solid catalyst component. The content of titanium per gram of the solid catalyst component was 21 mg.

(b) Vapor Phase Polymerization

A stainless steel autoclave was used as a vapor phase polymerization apparatus, and a loop was formed using a blower, a flow control device and a dry type cyclone. The temperature of the autoclave was adjusted by flowing warm water through a jacket.

The solid catalyst component prepared above and triethylaluminum were fed at rates of 250 mg/hr and 50 mmol/hr, respectively, into the autoclave held at 80° C. At the same time, butene-1, ethylene and hydrogen gases were fed while adjusting the butene-1/ethylene ratio (molar ratio) in the internal vapor phase of the autoclave to 0.27 and also adjusting the hydrogen gas pressure to 17% of the total pressure, and polymerization was performed while the gases in the system were circulated. The resulting ethylene copolymer was a powder having a bulk density of 0.47, a melt index (MI) of 1.0, a density of 0.9208 and an average particle diameter of 600 μ, not containing particles smaller than 150 μ.

Catalytic activity was 200,000 g.copolymer/g.Ti. The F. R. value (F. R.=MI10/MI2.16) of the this copolymer represented by the ratio of a melt index MI1.0 as measured under a load of 10 kg to a melt index MI2.16 as measured under a load of 2.16 kg, both at 190° C., according to the method defined by ASTM-D1238-65T, was 7.2 and thus the molecular weight distribution was narrow.

Film was formed using this copolymer and it was extracted in boiling hexane for 10 hours. As a result, the hexane extraction was as small as 0.5 wt %.

EXAMPLE 2

A solid catalyst component was prepared in the same way as in Example I except that 1.6 ml of tetraethoxysilane was used in place of 2.2 ml of tetraethoxysilane as the component [III].

Using this solid catalyst component, polymerization was carried out in the same manner as in Example 1. As a result, there was obtained a powder having a bulk density of 0.47, a melt index (MI) of 1.0, a density of 0.9210 and an average particle diameter of 610 μm, not containing particles smaller than 150 μm. Catalytic activity was as high as 220,000 g.copolymer/g.Ti. The F. R. value was 7.3, thus indicating a narrow molecular weight distribution, and the hexane extraction was 0.6 wt %.

EXAMPLE 3

A solid catalyst component was prepared in the same way as in Example 1 except that 2.0 ml of triethoxychlorosilane was used in place of 2.2 ml of tetraethoxysilane as the component [III].

Using this solid catalyst component, polymerization was carried out in the same manner as in Example 1. As a result, there was obtained a powder having a bulk density of 0.45, a melt index (MI) of 0.9, a density of 0.9215 and an average particle diameter of 600 μm, not containing particles smaller than 150 μm. Catalytic activity was as high as 210,000 g.copolymer/g.Ti. The F. R. value was 7.4, thus indicating a narrow molecular weight distribution, and the hexane extraction of 0.6 wt %.

EXAMPLE 4

A solid catalyst component was prepared in the same way as in Example 1 except that 3.6 g of boron triethoxide was used in place of aluminum triethoxide as the component [II]-(2).

Using this solid catalyst component, polymerization was conducted in the same manner as in Example 1. As a result, there was obtained a powder having a bulk density of 0.44, a melt index (MI) of 1.1, a density of 0.9203 and an average particle diameter of 580 μm, not containing particles smaller than 150 μm. Catalytic activity was as high as 180,000 g.copolymer/g.Ti. The F.R. value was 7.3, thus indicating a narrow Molecular weight distribution, and the hexane extraction was 0.6 wt %.

EXAMPLE 5

A solid catalyst component was prepared in the same way as in Example 1 except that 2.9 g of magnesium ethoxide was used in place of aluminum triethoxide as the component [II]-(2).

Using this solid catalyst component, polymerization was carried out in the same manner as in Example 1. As a result, there was obtained a powder having a bulk density of 0.44, a melt index (MI) of 1.1, a density of 0.9196 and an average particle diameter of 600 μm, not containing particles smaller than 150 μm. Catalytic activity was as high as 180,000 g.copolymer/g.Ti. The F.R. value was 7.3 thus indicating a narrow molecular weight distribution, and the hexane extraction of 0.6 wt %.

EXAMPLE 6

(a) Preparation of Solid Catalyst Component 50 g of $SiO_2$ (Fuji-Davison #955) which had been calcined at 600° C. was placed in a three-necked flask having a capacity of 500 ml and equipped with a stirrer and a reflux condenser, then 160 ml of dehydrated hexane and 2.2 ml of titanium tetrachloride were added, allowing reaction to take place for 3 ours under the reflux of hexane. After cooling 45 ml of a 1 mmol/cc solution of diethylaluminum chloride in hexane was added and reaction was again allowed to take place for 2 hours under the reflux of hexane, followed by drying under reduced [I] pressure at 120° C. to remove hexane. (Component 10 g of commercially available, anhydrous magnesium chloride, 4.2 g of aluminum triethoxide and 2.7 g of titanium tetrachloride were placed in a stainless steel pot having an internal volume of 400 ml and containing twenty-five stainless steel balls each ½ inch in diameter, and ball-milling was performed at room temperature in a nitrogen atmosphere for 16 hours to obtain a reaction product. (Component [II])

5.4 g of the reaction product thus obtained was dissolved in 160 ml of dehydrated ethanol and the resulting solution was poured in the whole amount thereof into the three-necked flask containing the component [I]. Reaction was allowed to take place for 3 hours under the reflux of ethanol, followed by drying under reduced pressure at 150° C. for 6 hours. Then, 2.2 ml of tetraethoxysilane was added and reacted at 90° C. for 3 hours to obtain a slid catalyst component. The content of titanium per gram of the solid catalyst component was 25 mg.

(b) Vapor Phase Polymerization

A stainless steel autoclave was used as a vapor phase polymerization apparatus, and a loop was formed using a blower, a flow control device and a dry type cyclone. The temperature o the autoclave was adjusted by flowing warm water through a jacket.

The solid catalyst component prepared above and triethylaluminum were fed at rates of 250 mg/hr and 50 mmol/hr, respectively, into the autoclave held at 80° C. At the same time, butene-1, ethylene and hydrogen gases were fed while adjusting the butene-1/ethylene mole ratio in the internal vapor phase of the autoclave to 0.27 and also adjusting the hydrogen gas pressure to 17% of the total pressure, and polymerization was performed while the gases in the system were circulated. The resulting ethylene copolymer was a powder having a bulk density of 0.46, a melt index (MI) of 1.0, a density of 0.9208 and an average particle diameter of 650 μ, not containing particles smaller than 150 μ.

Catalytic activity was 240,000 g.copolymer/g.Ti. The F.R. value (F. R.=MI10/MI2.16) of this copolymer represented by the ratio of a melt index MI10 as measured under a load of 10 kg to a melt index MI2.16 as measured under a load of 2.16 kg, both at 190° C. according to the method defined by ASTM-D1238-65T, was 7.4 and thus the molecular weight distribution was narrow.

Film was formed using this copolymer and it was extracted in boiling hexane 10 hours. As a result, the hexane extraction was as small as 0.7 wt %.

EXAMPLE 7

A solid catalyst component was prepared in the same way in Example 1 except that $Al_2O_3$ was used in place of the $SiO_2$ as the component [I]-(1).

Using this solid catalyst component, polymerization was conducted in the same manner as in Example 1. As a result, there was obtained a powder having a bulk density of 0.42, a melt index (MI) of 1.2, a density of 0.9199 and an average particle diameter of 560 μm, not containing particles smaller than 150 μm. Catalytic activity was as high as 140,000 g.copolymer/g.Ti. The F.R. value was 7.2, thus indicating a narrow molecular weight distribution, and the hexane extraction was 0.4 wt %.

EXAMPLE 8

A solid catalyst component was prepared in the same way as in Example 1 except that $SiO_2 \cdot Al_2O_3$ was used in place of $SiO_2$ as the component [I]-(1).

Using this solid catalyst component, polymerization was performed in the same manner as in Example 1. As a result, there was obtained a powder having a bulk density of 0.42, a melt index (MI) of 1.1, a density of 0.9216 and an average particle diameter of 590 μm, not containing particles smaller than 150 μm. Catalytic activity was as high as 150,000 g.copolymer/g.Ti. The F.R. value was 7.2, thus indicating a narrow molecular weight distribution, and the hexane extraction was 0.5 wt %.

EXAMPLE 9

A solid catalyst component containing 20 mg of titanium per gram thereof was prepared in the same way as in Example 1 except that 10 ml of tetrabutoxytitanium were used in place of 3.3 ml of titanium tetrachloride as the component [I]-(2).

Using this solid catalyst component, polymerization was conducted in the same way as in Example 1 except that butene-1/ethylene mole ratio in the internal vapor phase of the autoclave was adjusted to 0.28. As a result there was obtained a powder having a bulk density of 0.46, a melt index (MI) of 1.05, a density of 0.9212 and an average particle diameter of 700 μm, not containing particles smaller than 150 μm. Catalytic activity was as high as 210,000 g.copolymer/g.Ti. The F.R. value was 7.2, thus indicating a narrow molecular weight distribution, and the hexane extraction was 0.5 wt %.

EXAMPLE 10

A solid catalyst component containing 20 mg of titanium and 6 mg of vanadium per gram thereof was prepared in the same way as in Example 1 except that 3.3 ml of titanium tetrachloride and 0.5 ml of triethoxyvanadyl were used in place of 3.3 ml of titanium tetrachloride as the component [I]-(2).

Using this solid catalyst component, polymerization was conducted in the same way as in Example 1 except that butene-1/ethylene mole ratio in the internal vapor phase of the autoclave was adjusted to 0.28. As a result, there was obtained a powder having a bulk density of 0.45, a melt index (MI) of 1.09, a density of 0.9221 and an average particle diameter of 740 μm, not containing particles smaller than 150 μm. Catalytic activity was as high as 230,000 g.copolymer/g.Ti. The F. R. value was 7.5, thus indicating a narrow molecular weight distribution, and the hexane extraction was 0.7 wt %.

EXAMPLE 11

(a) Preparation of Solid Catalyst Component 50 g of $SiO_2$ (Fuji Davison #955) which had been calcined at 600° C. was placed in a three-necked flask having a capacity of 500 ml and equipped with a stirrer and a reflux condenser, then 160 ml of dehydrated hexane and 3.3 ml of titanium tetrachloride were added and reaction was allowed to take place for 3 hours. After cooling, 45 ml of a 1 mmol/cc solution of diethylaluminum chloride in hexane was added and reaction was again allowed to proceed under the reflux of hexane of 2 hours, followed drying at 120° C. under reduced pressure to remove the hexane. (Component [I])

10 g of commercially available, anhydrous magnesium chloride and 4.2 g of aluminum triethoxide were placed in a stainless steel pot having an internal volume of 400 ml and containing twenty-five stainless steel balls each ½ inch in diameter, and ball-milling was performed at room temperature in a nitrogen atmosphere to obtain a reaction product. (Component [II])

5.4 g of the reaction product was dissolved in 160 ml of dehydrated ethanol and the resultant solution was poured into the three-necked flask containing the component [I]. Reaction was allowed to take place under the reflux of ethanol for 3 hours, followed by drying at 150° C. under reduced pressure for 6 hours. Then, 2.2 ml of tetraethoxysilane was added and reacted at 90° C. for 3 hours to obtain a solid catalyst component which contained 21 mg of titanium per gram thereof.

Then, 150 ml of hexane and 45 mmol of diethyl aluminum was added and reaction was allowed to take place under the reflux of hexane for 1 hour. Thereafter, the hexane was removed by blowing of nitrogen at 70° C. to obtain a solid catalyst component.

Using this solid catalyst component, polymerization was conducted in the same manner as in Example 1. The resultant copolymer was a powder having a bulk density 0.46, a MI of 0.99, a F. R. value of 7.3, a density of 0.9206 and an average particle diameter of 720 μm, not containing particles smaller than 150 μm. The hexane extraction was as low as 0.5 wt %.

Comparative Example 1

(a) Preparation of solid Catalyst Component 10 g of commercially available, anhydrous Magnesium chloride and 4.2 g of aluminum triethoxide were placed in a stainless steel pot having an internal volume of 400 ml and containing twenty-five stainless steel balls each ½ inch in diameter, and ball-milling was performed at room temperature in a nitrogen atmosphere for 16 hours to obtain a reaction product.

A three-necked flask equipped with a stirrer and a reflux condenser was purged with nitrogen and then charged with 5 g of the reaction product obtained above and 5 g of $SiO_2$ (Fuji-Davison #952) which had been calcined at 600° C. Then, 100 ml of tetrahydrofuran was added and reaction was allowed to take place at 60° C. for 2 hours, followed by drying at 120° C. under reduced pressure to remove the tetrahydrofuran. Next, 50 cc of hexane was added. After stirring, 1.1 ml of titanium tetrachloride was added and reaction was allowed to take place under the reflux of hexane for 2 hours to obtain a solid catalyst component. The content of titanium per gram of the solid catalyst component was 40 mg.

(b) Vapor Phase Polymerization

Using the apparatus described in Example 1, a vapor-phase polymerization was carried out as follows.

The solid catalyst component prepared above and triethylaluminum were fed at rates of 250 mg/hr and 50 mmol/hr, respectively, into the autoclave held at 80° C. At the same time, butene-1, ethylene and hydrogen gases were fed while adjusting the butene-1/ethylene mole ratio in the internal vapor phase of the autoclave to 0.25 and the hydrogen pressure to 15% of the total pressure, and polymerization was carried out while the gases in the system were circulated by the blower. The resultant ethylene copolymer was a powder having a bulk density of 0.41, a melt index (MI) of 1.2, a density of 0.9210 and an averag particle diameter of 700 μ, not containing particles smaller than 150 μ.

Catalytic activity was 112,000 g.copolymer/g.Ti. The F.R. value was 7.6 and the hexane extraction as 1.1 wt %.

The following is a flowchart showing a manufacturing process for the catalyst used in the present invention.

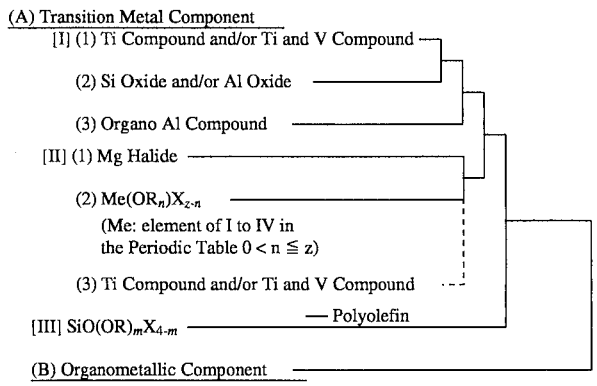

What is claimed is:

1. A solid catalyst component for preparing a polyolefin by polymerizing an olefin or olefins in the presence of a catalyst comprising a solid catalyst component and an organometallic compound, the said solid catalyst component being prepared by the reaction of the following components (I) and (II) in an organic solvent selected from the group consisting of inert hydrocarbons, alcohols, phenols, ethers, ketones, esters, amines, nitriles and mixtures thereof, and further reacting the resulting reaction product with the following component (III):

(I) a reaction product obtained by reacting:
(1) a silicon oxide, and
(2) a titanium compound, or a titanium compound and a vanadium compound, and further reacting the resulting reaction product with:
(3) an organoaluminum compound;

(II) a reaction product obtained by the reaction of:
(1) a magnesium halide, and
(2) a compound represented by the general formula $Me(OR)_nX_{z-n}$ wherein Me represents an element of Groups I to IV in the Periodic Table, z represents the valence of the element Me, n is $0<n\leq z$, X is a halogen atom, and R is a hydrocarbon radical having 1 to 20 carbon atoms; and (III) a compound represented by the general formula $Si(OR)_mX_{4-m}$ wherein R is a hydrocarbon radical having 1 to 20 carbon atoms, X is a halogen atom, and m is $0\leq m\leq 4$.

2. A solid catalyst component for preparing a polyolefin by polymerizing or copolymerizing an olefin or olefins in the presence of a catalyst comprising a solid catalyst component and an organometallic compound, the said solid catalyst component being prepared by the reaction of the following components (I) and (II) in an organic solvent selected from the group consisting of inert hydrocarbons, alcohols, phenols, ethers, ketones, esters, amines, nitriles and mixture thereof, and further reacting the resulting reaction product with the following component (III):

(I) a reaction product obtained by reacting:
(1) a silicon oxide and
(2) a titanium compound, or a titanium compound and a vanadium compound, and further reacting the resulting reaction product with:
(3) an organoaluminum compound;

(II) a reaction product obtained by the reaction of:
(1) a magnesium halide,
(2) a compound represented by the general formula $Me(OR)_nX_{z-n}$ wherein Me represents an element of Groups I and IV in the Periodic Table, z represents the valence of the element Me, n is $0<n\leq z$, X is a halogen atom, and R is a hydrocarbon radical having 1 to 20 carbon atoms, and
(3) a titanium compound, or a titanium compound and a vanadium compound; and (III) a compound represented by the general formula: $Si(OR)_mX_{4-m}$ wherein R is a hydrocarbon radical having 1 to 20 carbon atoms, X is a halogen atom, and m is $0\leq m\leq 4$.

3. A solid catalyst component of claim 1 wherein the reaction ratio of the component [I]-(1) and the component [I]-(2) is 0.01 to 10.0 mmol of the component [I]-(2) per gram of the component [I]-(1).

4. A solid catalyst component of claim 1 wherein the contact ratio of the contact reaction product of the components [I]-(1) and [I]-(2) and the component [I]-(3) is in the range of 01. to 100 in terms of component [I]-(3)/component [I]-(2) (molar ratio).

5. A solid catalyst component of claim 1 wherein the reaction ratio of the component [II]-(1)and [II]-(2) is 0.01 to 10 in the terms of Me/Mg (molar ratio).

6. A solid catalyst component of claim 1 wherein the Component II-(1) is used in an amount of 0.01 to 20 mmol per gram of the Component I-(1).

7. A solid catalyst component of claim 2 wherein the component [II]-(3) and [II]-(1) is in the range of 0.01 to 5 in terms of component [II]-(3)/component [II]-(1) (molar ratio).

8. A solid catalyst component of claim 1 wherein the contact reaction ratio of the reaction product of the components [I] and [II] and the component [III] is 0.01 to 10 in terms of the component [III]/the component [I]-(2) (molar ratio).

9. A solid catalyst component of claim 1 wherein the titanium compound is a titanium tetrahalide.

10. A solid catalyst component of claim 1 wherein the oganoaluminum compound is a compound represented by the general formula $R_nAlX_{3-n}$ wherein R is a hydrocarbon radical having 1 to 24 carbon atoms, X is a halogen atom, and n is $1 < n \leq 3$.

11. A solid catalyst component for preparing a polyolefin as set forth in claim 1, wherein the titanium compound is a compound represented by the following general formula or a reduced product thereof:

$Ti(OR)_nX_{4-n}$ where R is an alkyl, aryl or aralkyl group having 1 to 20 carbon atoms, X is a halogen atom and n is in the range of $0 \leq n \leq 4$.

12. A solid catalyst component for preparing a polyolefin as set forth in claim 2, wherein the titanium compound is a compound represented by the following general formula or a reduced product thereof:

$Ti(OR)_nX_{4-n}$ where R is an alkyl, aryl or aralkyl group having 1 to 20 carbon atoms, X is a halogen atom and n is in the range of $0 \leq n \leq 4$.

13. A solid catalyst component of claim 1, wherein the reaction of components (I) and (II) is conducted at a temperature of 50° to 300° C. for 1 minute to 48 hours.

14. A solid catalyst component of claim 1, wherein the organic solvent is an inert hydrocarbon selected from the group consisting of pentane, hexane, cyclohexane, heptane, octane, nonane, decane, benzene, toluene, xylene and mixtures thereof.

15. A solid catalyst component of claim 1, wherein the reaction of the reaction product of components (I) and (II) with component (III) is conducted in an organic solvent.

16. A solid catalyst component of claim 15, wherein the organic solvent is removed after the reaction.

17. A catalyst for preparing a polyolefin, the catalyst comprising the solid catalyst component of claim 1 and an organoaluminum compound.

18. A catalyst for preparing a polyolefin, the catalyst comprising the solid catalyst component of claim 1, an organometallic compound and an organic ester.

* * * * *